United States Patent
Feng et al.

(10) Patent No.: US 10,122,797 B2
(45) Date of Patent: Nov. 6, 2018

(54) INDEPENDENT AND MULTI-UNIT CO-OPERATION STAGE CONTROL SYSTEM

(71) Applicant: Zhejiang Dafeng Industry Co., Ltd., Yuyao (CN)

(72) Inventors: Hua Feng, Yuyao (CN); Huafeng Yan, Yuyao (CN); Lifeng Wu, Yuyao (CN); Zhen Liu, Yuyao (CN); Zhengping Wu, Yuyao (CN); Haoxiang Xu, Yuyao (CN)

(73) Assignee: Zhejiang Dafeng Industry Co., Ltd., Yuyao (CN)

( * ) Notice: Subject to any disclaimer, the term of this patent is extended or adjusted under 35 U.S.C. 154(b) by 113 days.

(21) Appl. No.: 15/209,059

(22) Filed: Jul. 13, 2016

(65) Prior Publication Data
US 2017/0034280 A1     Feb. 2, 2017

(30) Foreign Application Priority Data

Jul. 28, 2015 (CN) .......................... 2015 1 0450339
Jul. 28, 2015 (CN) ....................... 2015 2 0555928 U

(51) Int. Cl.
*H04L 29/08* (2006.01)
*H05B 33/08* (2006.01)
*H05B 7/02* (2006.01)
*G08C 17/02* (2006.01)
*H05B 37/02* (2006.01)

(52) U.S. Cl.
CPC ............ *H04L 67/125* (2013.01); *G08C 17/02* (2013.01); *H05B 33/0842* (2013.01); *H05B 37/0272* (2013.01); *G08C 2201/42* (2013.01)

(58) Field of Classification Search
None
See application file for complete search history.

(56) References Cited

U.S. PATENT DOCUMENTS

| 6,386,985 | B1 * | 5/2002 | Rackham | .................. A63J 1/00 345/581 |
| 2011/0285854 | A1 * | 11/2011 | LaDuke | .................. G01S 11/00 348/169 |

* cited by examiner

*Primary Examiner* — Daniell L Negron
(74) *Attorney, Agent, or Firm* — The Webb Law Firm

(57) ABSTRACT

An independent and multi-unit co-operation stage control system is disclosed herein. The system includes a cloud server, a primary control unit, a secondary control unit and a stage safety monitoring subsystem.

4 Claims, 3 Drawing Sheets

INDEPENDENT AND MULTI-UNIT CO-OPERATION STAGE CONTROL SYSTEM

CROSS-REFERENCE TO RELATED APPLICATIONS

This application claims priority to Chinese Patent Application Nos. 201510450339.6 and 201520555928.6 both filed Jul. 28, 2015, the disclosures of which are hereby incorporated in their entirety by reference.

BACKGROUND OF THE INVENTION

Field of the Invention

The present invention relates to a stage control field, in particular, to an independent and multi-unit co-operation stage control system.

Description of Related Art

Currently, with the development of culture industry in china, the digital arena is becoming more and more important in the performance activities. The requirements for control of the lighting, sound, video, mechanical, and scene and other stage elements are becoming increasingly high, increasing precise and increasingly complex during the performance, and the stage central-control system is increasingly close to the actual needs for stage performances.

In order to achieve perfect presentation of stage effects, it is necessary to perform reasonable combination of lighting, sound, mechanical, scene, video and real-time control. Traditional stage control is achieved by professional stage technicians to implement real-time operation and control on their separate hardware control consoles according to the requirements of a director or a screenwriter, which proposes high professional technical skills, with heavy workload and easy to improper operations that may cause abnormal conditions. In addition, the specialized hardware control console is too bulky, expensive and not easy to move and transport.

To improve the efficiency and achieve centralized control and unified management is a development trend of stage effect control. It is required to enhance the performance effect and achieve deep processing stage performance effect integrating sound, light, electricity, images and texts, making the stage background, stage lighting, stage modeling are closely related to the themes; and overcome the drawbacks of decentralized management and complex control with too many staffs. However, it is difficult to achieve synchronization centralized control of multiple devices using the existing control systems.

SUMMARY OF THE INVENTION

An object of this invention is to provide an independent and multi-unit co-operation stage control system.

According to one aspect of the present invention, an independent and multi-unit co-operation stage control system is provided. The system includes a cloud server, a primary control unit, a secondary control unit, a multi-function extended interface, a LTE wireless communication unit, a storage unit, a stage lighting subsystem, a stage mechanical subsystem, a stage sound subsystem, a stage power supply subsystem, and a stage safety monitoring subsystem. The cloud server is connected with the primary control unit and the secondary control unit, the primary control unit and the secondary control unit are connected with the multi-function extended interface, LTE wireless communication unit, storage unit, stage lighting subsystem, stage mechanical subsystem, stage sound subsystem, stage power supply subsystem and stage safety monitoring subsystem respectively.

The cloud server is configured to store and set a program for stage performance and a parameter to be executed by various subsystems.

The primary control unit is configured to control an operation of various stage subsystems and receive data information from all subsystems.

The secondary control unit is a hot standby unit of the primary control unit and is used for seamless switching when failure or upgrading of the primary control unit.

The multi-function extended interface is configured to connect a variety of peripherals.

The LTE wireless communication unit is configured to interact with a handheld LTE wireless device of a stage operator.

The storage unit is configured to store stage performance data.

The stage lighting subsystem, stage mechanical subsystem and stage sound subsystem are used to control the lighting, mechanical and sound units according to an instruction of the primary control unit, respectively.

The stage power supply subsystem is configured to supply power for various stage units.

The stage safety monitoring subsystem is configured to execute a safety monitoring on the stage equipment and personnel.

Optional, the primary control unit specifically comprises a performance raw data download unit, a first GPS timing unit, a data pre-processing unit, an encryption unit, a routing unit, a reset unit, a distributing unit, an instruction dispatch unit and a monitoring data acquisition unit.

The performance raw data download unit is used to obtain an independent raw data of performance of the stage mechanical subsystem, the stage lighting subsystem and the stage sound subsystem from the cloud server respectively.

The first GPS timing unit is used for real-time access to GPS time signal, and sending the time signal as a real-time parameter to the data pre-processing unit.

The data pre-processing unit is used to encode independent performance data of stage mechanical subsystem, stage lighting subsystem and stage sound subsystem to stage deep processing performance data according to the performance time setting and GPS time parameter.

The encryption unit is used to encrypt the stage deep processing performance data after encoded by data pre-processing unit.

The routing unit is used to acquire a routing address of the subsystem that needs to send performance data according to the pre-assigned IP address.

The reset unit is used to reset the stage mechanical subsystem, stage lighting subsystem and stage sound subsystem, including establishing connection with the stage mechanical subsystem, stage lighting subsystem and stage sound subsystem and acquiring their original states.

The distributing unit is used to distribute the stage deep processing performance data to the stage mechanical subsystem, stage lighting subsystem and stage sound subsystem according to the routing addresses.

The instruction dispatch unit, used to send a control instruction to at least one of the stage mechanical subsystem, stage lighting subsystem, stage sound subsystem according to a performance time setting, and the control instruction is used to instruct the stage performance according to a corresponding data in the stage deep processing performance data.

The monitoring data acquisition unit, used to receive monitoring data sent from the stage safety monitoring subsystem, and compare the monitoring data with a preset value, and give prompts via the LTE wireless communication unit when exceeding the preset value.

Optional, the stage lighting subsystem specifically comprises a visual unit, a first performance data acquisition unit, a first performance data decoding unit, a second GPS timing unit, a LED light control unit, a first storage unit, and a LED light driving unit.

The visual unit, first performance data acquisition unit, first performance data decoding unit, second GPS timing unit, first storage unit and LED light driving unit are connected with the LED light control unit, and the LED light driving unit is connected with the LED light.

The visual unit is used for real-time display of a stage lighting model.

The first performance data acquisition unit is configured to receive the stage deep processing performance data sent from the primary control unit.

The first performance data decoding unit is configured to decode a LED light performance parameter from the received stage deep processing performance data.

The LED light control unit is configured to receive control instruction from the primary control unit, and control and drive the LED light according to a timing signal provided by the LED light performance parameter and the second GPS timing unit.

The first storage unit is configured to store the LED light performance parameter.

The LED light driving unit is configured to drive the LED light according to the instruction of the LED light control unit.

Optional, the stage sound subsystem comprises a second performance data acquisition unit, a second performance data decoding unit, a second storage unit, an audio control unit, a sound and light matching unit, an audio input unit and an audio processing unit.

The second performance data acquisition unit, second performance data decoding unit, second storage unit, sound and light matching unit, audio input unit and audio processing unit are all connected to the audio control unit.

The second performance data acquisition unit is configured to receive the stage deep processing performance data sent from the primary control unit.

The second performance data decoding unit is configured to decode the audio performance parameter from the received stage deep processing performance data.

The second storage unit is configured to store the audio performance parameter.

The sound and light matching unit is used for real-time sensing and acquiring the lighting change parameter of the LED light, to achieve real-time matching of sound and light.

The audio control unit is configured to receive the control instruction from the primary control unit, and control and drive the sound according to the lighting change parameter induced by the audio performance parameter and the sound and light matching unit.

The audio input unit is configured to send audio data to the audio processing unit according to the control instruction of audio control unit.

The audio processing unit is configured to process and play the audio data.

Optional, the stage mechanical subsystem comprises a third performance data acquisition unit, a third performance data decoding unit, a third storage unit, a third GPS unit, a converter unit, a motor unit, a mechanical equipment control unit and an equipment selection unit.

The third performance data acquisition unit, third performance data decoding unit, third storage unit, mechanical equipment control unit, converter unit, equipment selection unit are connected with the motor unit successively, and the third GPS unit is connected with the mechanical equipment control unit.

The third performance data acquisition unit is configured to receive the stage deep processing performance data sent from the primary control unit.

The third performance data decoding unit is configured to decode the mechanical equipment performance parameter from the received stage deep processing performance data.

The third storage unit is configured to store the mechanical equipment performance parameter.

The mechanical equipment control unit is configured to receive control instruction from the primary control unit, and control a mechanical equipment on the stage according to the mechanical equipment performance parameter and the timing signal provided by the third GPS unit.

The equipment selection unit is configured to select the mechanical equipment to be operated according to the control signal.

The converter unit and motor unit are used for real-time driving the mechanical equipment to be operated.

The independent and multi-unit co-operation stage control system in the patent application includes a cloud server, a primary control unit, a secondary control unit and a stage safety monitoring subsystem. This system can achieve centralized monitoring, unified management and synchronous control of multiple systems on the stage, enhance the performance effect and working efficiency, and realize safe operation of the stage.

DESCRIPTION OF THE INVENTION

The present invention is described in details in combination with drawings and several preferred embodiments, but the invention is not limited to these embodiments. Any alternatives, modifications, equivalents methods and schemes made within the essence and scope of the present invention shall fall within the scope of protection herein. In order to enable the public to have a thorough understanding of the present invention, specific details are described in the preferred embodiments herein, but those skilled in the art can fully understand the invention without the description about these details.

Figure 1:
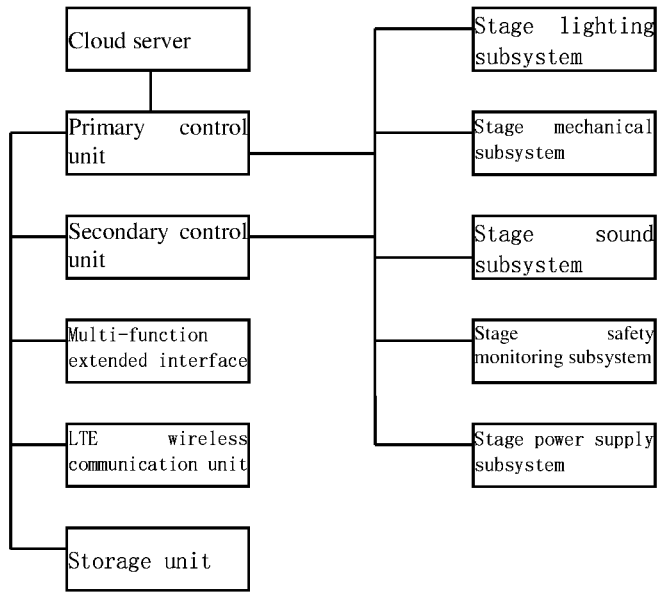
FIG. 1 shows a schematic diagram of an independent and multi-unit co-operation stage control system according to an embodiment of the present invention.

According to an embodiment of the present invention, an independent and multi-unit co-operation stage control system is provided, as shown in FIG. 1, including: a cloud server, a primary control unit, a secondary control unit, a multi-function extended interface, a LTE wireless communication unit, a storage unit, a stage lighting subsystem, a stage mechanical subsystem, a stage sound subsystem, a stage power supply subsystem and a stage safety monitoring subsystem.

The cloud server is connected with the primary control unit and the secondary control unit, the primary control unit and the secondary control unit are connected with the multi-function extended interface, LTE wireless communication unit, storage unit, stage lighting subsystem, stage mechanical subsystem, stage sound subsystem, stage power supply subsystem and stage safety monitoring subsystem respectively.

The cloud server is configured to store and set the programs for stage performance and parameter to be executed by various subsystems.

The primary control unit is configured to control the operation of various stage subsystems and receive the data information transmitted from all subsystems.

The secondary control unit, a hot standby unit of the primary control unit, is used for seamless switching when failure or upgrading of the primary control unit.

The multi-function extended interface is configured to connect a variety of peripherals.

The LTE wireless communication unit is configured to interact with the handheld LTE wireless devices of stage operators.

The storage unit is configured to store the stage performance data.

The stage lighting subsystem, stage mechanical subsystem and stage sound subsystem are used to control the lighting, mechanical and sound units according to the instruction of the primary control unit, respectively.

The stage power supply subsystem is configured to supply power for various stage units.

The stage safety monitoring subsystem is configured to execute the safety monitoring on the stage equipment and personnel.

Figure 2:
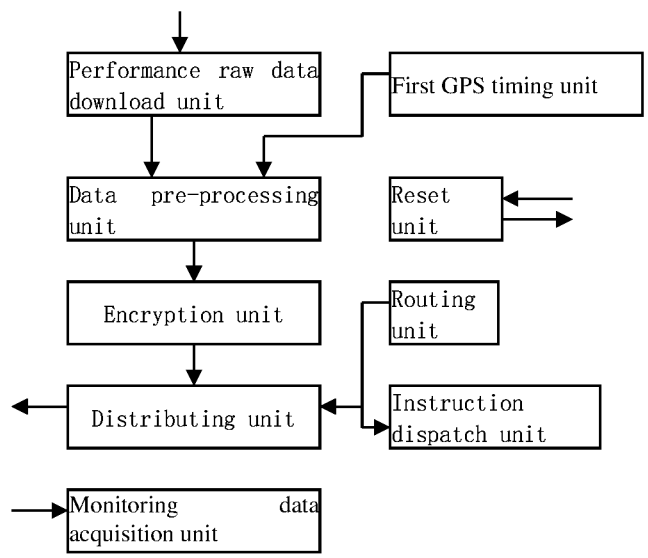
FIG. 2 shows a schematic diagram of a primary control unit according to an embodiment of the present invention.

According to an embodiment of the present invention, as shown in FIG. 2, the primary control unit specifically includes a performance raw data download unit, a first GPS timing unit, a data pre-processing unit, an encryption unit, a routing unit, a reset unit, a distributing unit, an instruction dispatch unit, and a monitoring data acquisition unit.

The performance raw data download unit is used to obtain the independent raw data of performance of the stage mechanical subsystem, the stage lighting subsystem and the stage sound subsystem from the cloud server respectively.

The first GPS timing unit is used for real-time access to GPS time signal, and sending the time signal as real-time parameter to the data pre-processing unit.

The data pre-processing unit is used to encode the independent performance data of stage mechanical subsystem, stage lighting subsystem and stage sound subsystem to the stage deep processing performance data according to the performance time setting and GPS time parameter;

The encryption unit is used to encrypt the stage deep processing performance data after encoded by data pre-processing unit.

The routing unit is used to acquire the routing address of the subsystem that needs to send the performance data according to the pre-assigned IP address.

The reset unit is used to reset the stage mechanical subsystem, stage lighting subsystem and stage sound subsystem, including establishing connection with the stage mechanical subsystem, stage lighting subsystem and stage sound subsystem and acquiring their original states.

The distributing unit is used to distribute the stage deep processing performance data to the stage mechanical subsystem, stage lighting subsystem and stage sound subsystem according to the routing addresses.

The instruction dispatch unit is used to send control instruction to one of the stage mechanical subsystem, stage lighting subsystem, stage sound subsystem or the combination thereof according to the performance time setting, and the control instruction are used to instruct the stage performance according to the corresponding data in the stage deep processing performance data.

The monitoring data acquisition unit is used to receive the monitoring data sent from the stage safety monitoring subsystem, and compare the monitoring data with the preset values, and give prompts via the LTE wireless communication unit when exceeding the preset values.

According to an embodiment of the present invention, the secondary control unit and the primary control unit can be set with the same configurations and in a hot standby state during stage performance.

Figure 3:
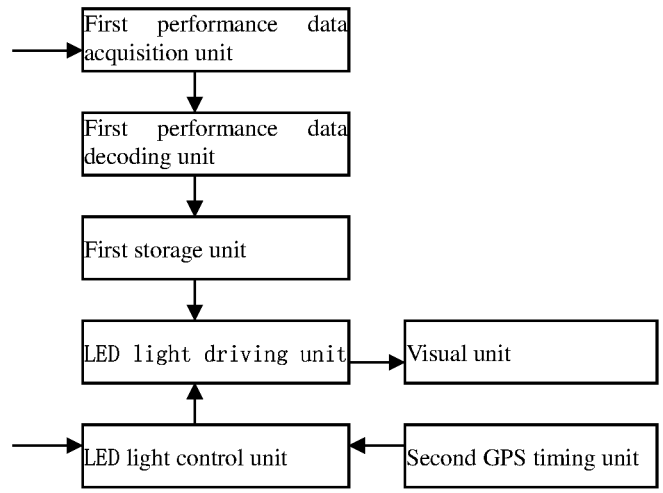
FIG. 3 shows a schematic diagram of a stage lighting subsystem according to an embodiment of the present invention.

According to an embodiment of the present invention, as shown in FIG. 3, the stage lighting subsystem specifically includes a visual unit, a first performance data acquisition unit, a first performance data decoding unit, a second GPS timing unit, a LED light control unit, a first storage unit, a LED light driving unit.

The visual unit, first performance data acquisition unit, first performance data decoding unit, second GPS timing unit, first storage unit and LED light driving unit are connected with the LED light control unit, and the LED light driving unit is connected with the LED light.

The visual unit is used for real-time display of the stage lighting model.

The first performance data acquisition unit is configured to receive the stage deep processing performance data sent from the primary control unit.

The first performance data decoding unit is configured to decode the LED light performance parameter from the received stage deep processing performance data.

The LED light control unit is configured to receive control instruction from the primary control unit, and control and drive the LED light according to the timing signal provided by the LED light performance parameter and the second GPS timing unit.

The first storage unit is configured to store the LED light performance parameter.

The LED light driving unit is configured to drive the LED light according to the instruction of the LED light control unit.

According to another embodiment of the present invention, the LED light control unit includes a stage model establishing unit, a reset unit, a target focus position selection unit, a LED light selection unit, a LED light rotation control unit, a focused image simulation unit, and a lighting instruction execution unit.

The stage model establishing unit, used to establish the stage model through the pre-set program in the LED light control unit according to the position information data of the actual stage, and output the established stage model to the visual unit.

The reset unit is used to send control signal to the LED light driving unit through the pre-set program in the LED light control unit, to drive LED light driving unit to move the LED light to the initial position.

The target focus position selection unit is used to select the target focus position in the stage model, and convert the target focus position to the position information data of the actual stage; The LED light selection unit is used to select all pre-adjustable LED light and detect if the relative focus position of the selected LED light is effective.

The LED light rotation control unit is used to calculate the horizontal rotation angle values and vertical rotation angle values of effective LED light according to the target focus positions, and convert them to control signal, then send the control signal to LED light driving unit to drive and control LED light to rotate to the corresponding positions and orientations.

The focused image simulation unit is used to simulate the focused images of all effective LED light projected to the target focus position in stage models, and output the simulated images to the visual unit.

The lighting instruction execution unit is used to execute the lighting operation according to the performance parameter of each LED light.

Figure 4:
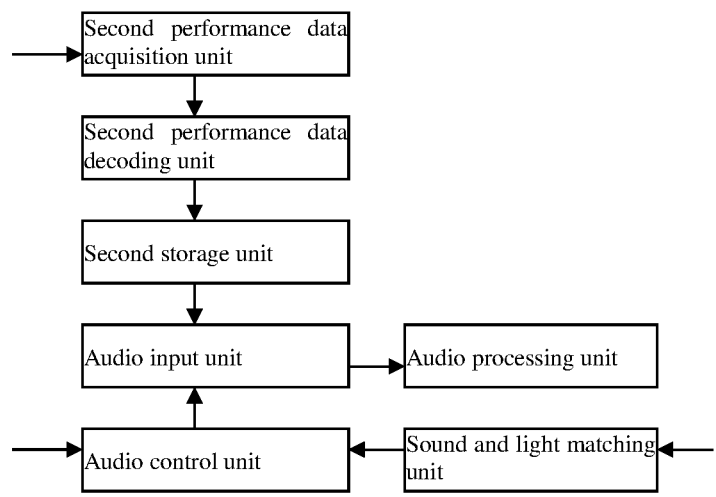
FIG. 4 shows a schematic diagram of a stage sound subsystem according to an embodiment of the present invention.

According to an embodiment of the present invention, as shown in FIG. 4, the stage sound subsystem includes a second performance data acquisition unit, a second performance data decoding unit, a second storage unit, an audio control unit, a sound and light matching unit, an audio input unit and an audio processing unit.

The second performance data acquisition unit, second performance data decoding unit, second storage unit, sound and light matching unit, audio input unit and audio processing unit are all connected to the audio control unit.

The second performance data acquisition unit is configured to receive the stage deep processing performance data sent from the primary control unit.

The second performance data decoding unit is configured to decode the audio performance parameter from the received stage deep processing performance data.

The second storage unit is configured to store the audio performance parameter.

The sound and light matching unit is used for real-time sensing and acquiring the lighting change parameter of the LED light, to achieve real-time matching of sound and light.

The audio control unit is configured to receive control instruction from the primary control unit, and control and drive the sound according to the lighting change parameter induced by the audio performance parameter and the sound and light matching unit.

The audio input unit is configured to send audio data to the audio processing unit according to the control instruction of audio control unit.

The audio processing unit is configured to process and play the audio data.

According to an embodiment of the present invention, the sound and light matching unit includes a photoelectric conversion circuit, a photoelectric sensing shaping circuit, a photoelectric sensing detection circuit and a D/A conversion circuit; one end of the photoelectric conversion circuit is connected with an induction light signal input, and the other end of the photoelectric conversion circuit is connected with the photoelectric sensing shaping circuit; the photoelectric sensing shaping circuit is connected with the photoelectric sensing detection circuit; the photoelectric sensing detection circuit is connected with the D/A conversion circuit; and the D/A conversion circuit is connected with the audio control unit.

According to an embodiment of the present invention, the photoelectric conversion circuit includes a photoelectric sensing circuit, a first preamplifier, a lowpass filter and a reshaper; the photoelectric sensing circuit is connected with the first preamplifier, the first preamplifier is connected with the lowpass filter, and the lowpass filter is connected with the reshaper.

According to an embodiment of the present invention, the photoelectric sensing detection circuit includes a drive circuit, a second preamplifier, a phase-sensitive detector, a balanced filter, a gain amplifier and a signal processor, wherein, the drive circuit is connected with the second preamplifier, the second preamplifier is connected with the phase-sensitive detector, the phase-sensitive detector is connected with the balanced filter, the balanced filter is connected with the gain amplifier, and the gain amplifier is connected with the signal processor.

According to an embodiment of the present invention, the audio processing unit includes a main speaker unit, an auxiliary speaker unit and a subwoofer speaker unit;

The main speaker unit includes a first equalizer, an exciter, a feedback suppressor, a first compressor/limiter, a first power amplifier and a main speaker; one end of the first equalizer is connected with the audio control unit, and the other end of the first equalizer is connected with the exciter; the exciter is connected with the feedback suppressor, the feedback suppressor is connected with the first compressor/limiter, the first compressor/limiter is connected with the first power amplifier, and the first power amplifier is connected with the main speaker.

The auxiliary speaker unit includes a second equalizer, a delayer, a second compressor/limiter, a second power amplifier and an auxiliary speaker; one end of the second equalizer is connected with the audio control unit, and the other end of the second equalizer is connected with the delayer, the delayer is connected with the second compressor/limiter, the second compressor/limiter is connected with the second power amplifier, and the second power amplifier is connected with the auxiliary speaker.

The subwoofer speaker unit includes a third equalizer, a frequency divider, a third compressor/limiter, a third power amplifier and a subwoofer speaker; one end of the third equalizer is connected with the audio control unit, and the other end of the third equalizer is connected with the frequency divider, the frequency divider is connected with the third compressor/limiter, and the third compressor/limiter is connected with the subwoofer speaker.

Figure 5:
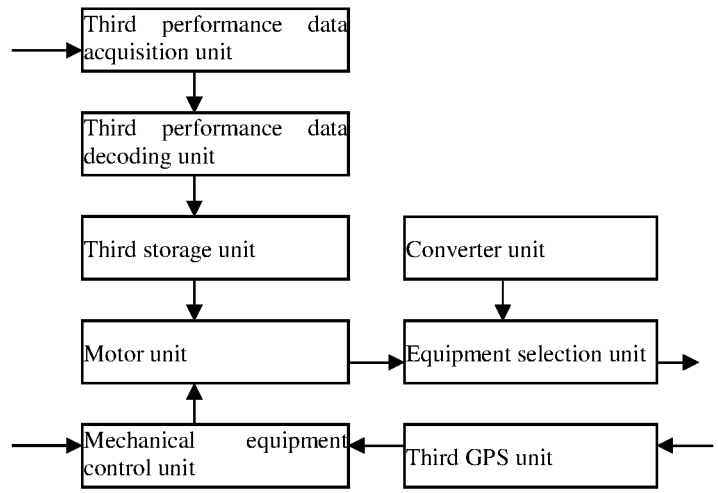
FIG. 5 shows a schematic diagram of a stage mechanical subsystem according to an embodiment of the present invention.

According to an embodiment of the present invention, as shown in FIG. 5, the stage mechanical subsystem includes a third performance data acquisition unit, a third performance data decoding unit, a third storage unit, a third GPS unit, a converter unit, a motor unit, a mechanical equipment control unit and an equipment selection unit, and the third performance data acquisition unit, third performance data decoding unit, third storage unit, mechanical equipment control unit, converter unit, equipment selection unit are connected with the motor unit successively, and the third GPS unit is connected with the mechanical equipment control unit.

The third performance data acquisition unit is configured to receive the stage deep processing performance data sent from the primary control unit.

The third performance data decoding unit is configured to decode the mechanical equipment performance parameter from the received stage deep processing performance data.

The third storage unit is configured to store the mechanical equipment performance parameter.

The mechanical equipment control unit is configured to receive control instruction from the primary control unit, and control the mechanical equipment on the stage according to the mechanical equipment performance parameter and the timing signal provided by the third GPS unit.

The equipment selection unit is configured to select the mechanical equipment to be operated according to the control signal.

The converter unit and motor unit are used for real-time driving the mechanical equipment to be operated.

Figure 6:
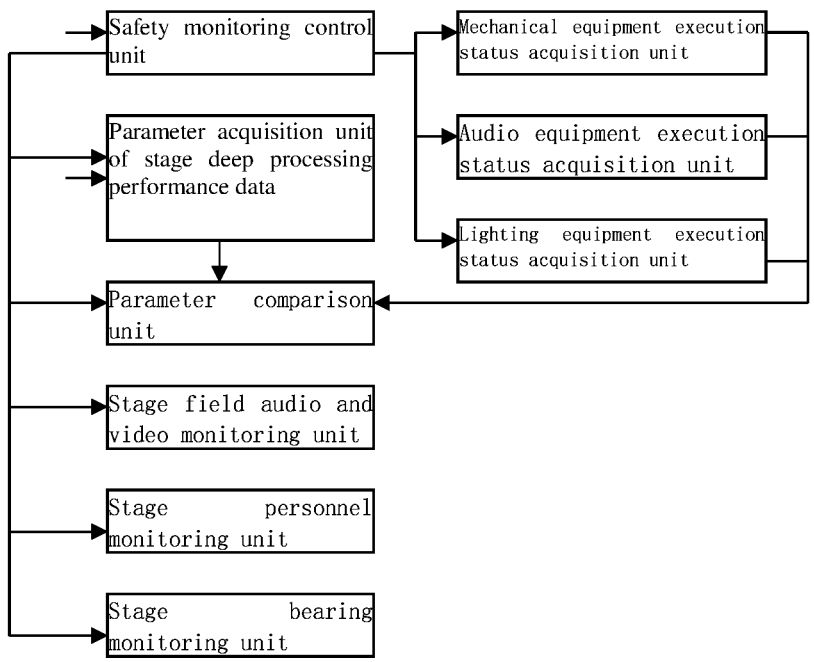
FIG. 6 shows a schematic diagram of a stage safety monitoring subsystem according to an embodiment of the present invention.

According to an embodiment of the present invention, as shown in FIG. 6, the stage safety monitoring subsystem including: a safety monitoring control unit, a parameter acquisition unit of stage deep processing performance data, a mechanical equipment execution status acquisition unit, an audio equipment execution status acquisition unit, a lighting equipment execution status acquisition unit, a parameter comparison unit, a stage field audio and video monitoring unit, a stage personnel monitoring unit, and a stage bearing monitoring unit.

The safety monitoring control unit is connected with the parameter acquisition unit of stage deep processing performance data, mechanical equipment execution status acquisition unit, audio equipment execution status acquisition unit, lighting equipment execution status acquisition unit, parameter comparison unit, stage field audio and video monitoring unit, stage personnel monitoring unit, and the stage bearing monitoring unit, respectively; the mechanical equipment execution status acquisition unit, audio equipment execution status acquisition unit, lighting equipment execution status acquisition unit are connected with the stage mechanical subsystem, stage sound subsystem and stage lighting subsystem, respectively.

The safety monitoring control unit is configured to receive the monitoring instruction sent from the primary control unit, and instruct the mechanical equipment execution status acquisition unit, audio equipment execution status acquisition unit, and lighting equipment execution status acquisition unit to acquire corresponding data according to the instruction.

The parameter acquisition unit of stage deep processing performance data is configured to directly acquire the performance data parameter, including mechanical, sound and lighting parameter, from the primary control unit.

The mechanical equipment execution status acquisition unit is configured to periodically acquire the sensing information of the connected mechanical equipment, and the sensing information includes the three-dimensional coordinates and operating state of mechanical components on the stage.

The audio equipment execution status acquisition unit is configured to acquire the stage audio playback information in a real-time manner.

The lighting equipment execution status acquisition unit is configured to acquire stage lighting operating information in a real-time manner.

The parameter comparison unit is configured to compare the parameter information acquired from stage deep processing performance data parameter acquisition unit with the operating state information acquired from the mechanical equipment execution status acquisition unit, audio equipment execution status acquisition unit, and lighting equipment execution status acquisition unit, and send the comparison results to the primary control unit.

The stage field audio and video monitoring unit is configured to monitor the live stage video and audio data and send them to the primary control unit.

The stage personnel monitoring unit is configured to monitor location state information of the performers during the stage performance in a real-time manner, and send to the primary control unit.

The stage bearing monitoring unit is configured to monitor the bearing information of the stage in a real-time manner, and send to the primary control unit.

According to an embodiment of the present invention, the stage field audio and video monitoring unit includes a field audio and video monitoring and control unit, a stage field data packing unit, a plurality of high-definition intelligent dome cameras, a plurality of orientation audio acquisition units, and an audio and video pre-processing unit.

The field audio and video monitoring and control unit is configured to receive the data acquisition instruction sent by the safety monitoring control unit, and instruct the high-definition intelligent dome camera to acquire corresponding data according to the instruction.

The high-definition intelligent dome cameras are used to acquire the real-time images of the performance site, and acquire relevant information including audience flow and crowd density, etc.

The orientation audio acquisition units are used to acquire the background noises of the performance site, and acquire relevant information including noise intensity, noise location, etc. The audio and video pre-processing unit is used for compressed encoding of the acquired audio and video data.

The stage field data packing unit is configured to pack the audio and video data after compressed encoding by the audio and video pre-processing unit, and send them to the primary control unit.

According to an embodiment of the present invention, the stage personnel monitoring unit includes a plurality of pressure sensing units uniformly arranged on the stage floor and a stage distribution monitoring unit connected with the pressure sensing units in a wired or wireless way.

The stage distribution monitoring unit includes a micro processing unit, a database unit and a display unit.

Each of the pressure sensing units has its own identity code; and each pressure sensing unit is configured to sense the pressure of object(s) above, and send the signal combination including a feedback signal, an identity code and a time for sending feedback signal to the micro processing unit when the sensed pressure rises from the value lower than the first preset pressure to the value higher than the second preset pressure.

When receiving a signal combination including a feedback signal, an identity code and a time for sending feedback signal from one of the pressure sensing units, the micro processing unit will preserve the signal combination in the database unit.

The database unit is configured to store the signal combination received from the micro processing unit, and store the stage position information of a plurality of pressure sensing units related to their identity codes.

The micro processing unit is further used to extract the signal combination received from the micro processing unit and the stage position information of the plurality of pressure sensing units from the database unit, and send them to the primary control unit, to provide the current positions and movement trajectory of the personnel on the stage.

According to an embodiment of the present invention, the stage bearing monitoring unit includes a stage area pressure acquisition unit and a unit time interval pressure calculation unit; the stage area pressure acquisition unit acquires the pressure parameter borne by each of the plurality of pressure sensing units, and the unit time interval pressure calculation unit is configured to calculate the sum of the unit time pressures within a specific area according to the pressure parameter borne by each of the sensing units, and send the sum of the pressures to the primary control unit, then the primary control unit determines if the stage is overloaded.

The above embodiments do not describe all details nor limit the present invention. Apparently, many modifications and variations can be made according to the above descriptions. These embodiments are to explain the principle and actual application of the present invention, so that the person skilled in the art can make good use of the invention or modify to use them. The present invention is limited only by the claims and their full scope and equivalents.

The invention claimed is:

1. An independent and multi-unit co-operation stage control system, comprising:
   a cloud server,
   a primary control unit,
   a secondary control unit,
   a multi-function extended interface,
   a LTE wireless communication unit,
   a storage unit,
   a stage lighting subsystem,
   a stage mechanical subsystem,
   a stage sound subsystem,
   a stage power supply subsystem, and
   a stage safety monitoring subsystem,
   wherein the cloud server is connected with the primary control unit and the secondary control unit, the primary control unit and the secondary control unit are connected with the multi-function extended interface, LTE wireless communication unit, storage unit, stage lighting subsystem, stage mechanical subsystem, stage sound subsystem, stage power supply subsystem and stage safety monitoring subsystem respectively;
   the cloud server is configured to store and set a program for stage performance and a parameter to be executed by various subsystems;
   the primary control unit is configured to control an operation of various stage subsystems and receive data information from all subsystems;
   the secondary control unit is a hot standby unit of the primary control unit and is used for seamless switching when failure or upgrading of the primary control unit;
   the multi-function extended interface is configured to connect a variety of peripherals;
   the LTE wireless communication unit is configured to interact with a handheld LTE wireless device of a stage operator;
   the storage unit is configured to store stage performance data;
   the stage lighting subsystem, stage mechanical subsystem and stage sound subsystem are used to control the lighting, mechanical and sound units according to an instruction of the primary control unit, respectively;
   the stage power supply subsystem is configured to supply power for various stage units; and
   the stage safety monitoring subsystem is configured to execute a safety monitoring on the stage equipment and personnel;
   wherein the primary control unit specifically comprises:
   a performance raw data download unit, used to obtain an independent raw data of performance of the stage mechanical subsystem, the stage lighting subsystem and the stage sound subsystem from the cloud server, respectively;
   a first GPS timing unit, used for real-time access to GPS time signal, and sending the time signal as a real-time parameter to the data pre-processing unit;
   a data pre-processing unit, used to encode independent performance data of stage mechanical subsystem, stage lighting subsystem and stage sound subsystem to stage deep processing performance data according to the performance time setting and GPS time parameter;
   an encryption unit, used to encrypt the stage deep processing performance data after encoded by data pre-processing unit;
   a routing unit, used to acquire a routing address of the subsystem that needs to send performance data according to the pre-assigned IP address;
   a reset unit, used to reset the stage mechanical subsystem, stage lighting subsystem and stage sound subsystem, including establishing connection with the stage mechanical subsystem, stage lighting subsystem and stage sound subsystem and acquiring their original states;
   a distributing unit, used to distribute the stage deep processing performance data to the stage mechanical subsystem, stage lighting subsystem and stage sound subsystem according to the routing addresses;
   an instruction dispatch unit, used to send a control instruction to at least one of the stage mechanical subsystem, stage lighting subsystem, stage sound subsystem according to a performance time setting, and the control instruction is used to instruct the stage performance according to a corresponding data in the stage deep processing performance data;
   a monitoring data acquisition unit, used to receive monitoring data sent from the stage safety monitoring subsystem, and compare the monitoring data with a preset value, and give prompts via the LTE wireless communication unit when exceeding the preset value.

2. The system according to claim 1, wherein the stage lighting subsystem specifically comprises a visual unit, a first performance data acquisition unit, a first performance data decoding unit, a second GPS timing unit, a LED light control unit, a first storage unit, and a LED light driving unit;
   the visual unit, first performance data acquisition unit, first performance data decoding unit, second GPS timing unit, first storage unit and LED light driving unit are connected with the LED light control unit, and the LED light driving unit is connected with the LED light;
   the visual unit is used for real-time display of a stage lighting model;
   the first performance data acquisition unit is configured to receive the stage deep processing performance data sent from the primary control unit;
   the first performance data decoding unit is configured to decode a LED light performance parameter from the received stage deep processing performance data;
   the LED light control unit is configured to receive control instruction from the primary control unit, and control and drive the LED light according to a timing signal provided by the LED light performance parameter and the second GPS timing unit;

the first storage unit is configured to store the LED light performance parameter;

the LED light driving unit is configured to drive the LED light according to the instruction of the LED light control unit.

3. The system according to claim 2, wherein the stage sound subsystem comprises a second performance data acquisition unit, a second performance data decoding unit, a second storage unit, an audio control unit, a sound and light matching unit, an audio input unit and an audio processing unit, wherein the second performance data acquisition unit, second performance data decoding unit, second storage unit, sound and light matching unit, audio input unit and audio processing unit are all connected to the audio control unit;

the second performance data acquisition unit is configured to receive the stage deep processing performance data sent from the primary control unit;

the second performance data decoding unit is configured to decode the audio performance parameter from the received stage deep processing performance data;

the second storage unit is configured to store the audio performance parameter;

the sound and light matching unit is used for real-time sensing and acquiring the lighting change parameter of the LED light, to achieve real-time matching of sound and light;

the audio control unit is configured to receive the control instruction from the primary control unit, and control and drive the sound according to the lighting change parameter induced by the audio performance parameter and the sound and light matching unit;

the audio input unit is configured to send audio data to the audio processing unit according to the control instruction of audio control unit;

the audio processing unit is configured to process and play the audio data.

4. The system according to claim 3, wherein the stage mechanical subsystem comprises a third performance data acquisition unit, a third performance data decoding unit, a third storage unit, a third GPS unit, a converter unit, a motor unit, a mechanical equipment control unit and an equipment selection unit, wherein the third performance data acquisition unit, third performance data decoding unit, third storage unit, mechanical equipment control unit, converter unit, equipment selection unit are connected with the motor unit successively, and the third GPS unit is connected with the mechanical equipment control unit;

the third performance data acquisition unit is configured to receive the stage deep processing performance data sent from the primary control unit;

the third performance data decoding unit is configured to decode the mechanical equipment performance parameter from the received stage deep processing performance data;

the third storage unit is configured to store the mechanical equipment performance parameter;

the mechanical equipment control unit is configured to receive control instruction from the primary control unit, and control a mechanical equipment on the stage according to the mechanical equipment performance parameter and the timing signal provided by the third GPS unit;

the equipment selection unit is configured to select the mechanical equipment to be operated according to the control signal;

the converter unit and motor unit are used for real-time driving the mechanical equipment to be operated.

* * * * *